United States Patent [19]
Lace

[11] 3,993,259
[45] Nov. 23, 1976

[54] FRONT DRIVE FOR A REVERSIBLE TAPE CARTRIDGE

[75] Inventor: Melvin Arthur Lace, Prospect Heights, Ill.

[73] Assignee: Motorola, Inc., Schaumburg, Ill.

[22] Filed: Mar. 31, 1975

[21] Appl. No.: 563,875

[52] U.S. Cl. .......................... 242/55.19 A; 226/182
[51] Int. Cl.² ........................................ B65H 17/48
[58] Field of Search ............... 242/55.19 A; 226/182

[56] References Cited
UNITED STATES PATENTS

| | | | |
|---|---|---|---|
| 2,338,421 | 1/1944 | Fries | 242/55.21 X |
| 3,252,670 | 5/1966 | Smith | 242/55.19 A |
| 3,677,628 | 7/1972 | Walker | 242/55.19 A X |
| 3,764,084 | 10/1973 | Tsukagoshi | 242/55.19 A |
| 3,826,440 | 7/1974 | Tsukagoshi | 242/55.19 A |
| 3,894,699 | 7/1975 | Bara | 242/55.19 A |

*Primary Examiner*—William D. Martin, Jr.
*Attorney, Agent, or Firm*—James W. Gillman; Donald J. Lisa

[57] ABSTRACT

A semicircular thrust arm has an anvil at one end and a rotatably mounted idler wheel at the other. The arm is pivotally mounted at its central portion in a predetermined tape player locale. A pushbutton activated lever mounts on the player and is aligned to forcibly engage the anvil on pushbutton depression. Anvil engagement causes the arm to rotate and forces the idler wheel into the cartridge pressure roller-player capstan interface whereby capstan rotation couples through the idler to the pressure roller. The idler thus reverses the rotatable drive to the pressure roller thereby reversing tape direction.

The rate of tape drive is controlled by selecting a particular ratio of idler wheel diameter to pressure roller diameter. The pressure roller consists of two cylinders fixed to rotate on a common shaft. The first cylinder is of selected diameter for normal tape speeds and the second cylinder, which is engaged by the idler, has a smaller diameter for increased speeds.

15 Claims, 7 Drawing Figures

FRONT DRIVE FOR A REVERSIBLE TAPE CARTRIDGE

BACKGROUND OF THE INVENTION

This invention relates generally to combination tape cartridge player combinations and more particularly to a front drive system for the same. Continuous loop cartridge and tape players are well known in the art. The cartridge consists of a housing having base and front wall portions. A platen and a hub are rotatably mounted on a spindle which extends vertically from the central area of the base portion. The pressure roller is rotatably located on a second base spindle towards the front wall of the cartridge. A continuous tape is wound about the hub and rests on the platen. A tape loop is guided from the inner hub convolution around a guide post and past front wall access windows and further around the pressure roller back to an outer hub convolution.

The tape player is comprised of a housing having a cartridge receiving cavity. A rotatably driven capstan is located at the inner recess of the cavity such that when a cartridge is received in the player the capstan rotatably engages a pressure roller through a cartridge front access. The player also has a tape head past which the cartridge tape is driven when the capstan drives the pressure roller.

As a result of my recent invention U.S. patent application Ser. No. 563,947, filed Mar. 31, 1975 and entitled "A Front Drive Cartridge Tape Player System With Fast Forward and Reverse Modes" it is now possible to drive a continuous loop cartridge in the reverse direction from the cartridge pressure roller. While my above-mentioned application discusses one means for accomplishing fast forward and reverse modes of cartridge-player operation, alternative means might prove beneficial in particular cases.

SUMMARY OF THE INVENTION

It is an object of the present invention, therefore, to provide a drive mechanism in a cartridge tape player combination suitable for driving the tape in a fast forward-reverse mode.

Briefly, the drive mechanism is in a cartridge and tape player. The cartridge has a base portion and a front wall, with a pressure roller rotatably mounted to the base and accessible through an access in the front wall. The pressure roller is comprised of a first cylinder having a selected radius, and a second cylinder having a smaller radius. The cylinders' longitudinal axes are aligned and positioned to rotate about a common shaft, each cylinder is affixed to the other for rotation in unison. A continuous loop tape in the cartridge is driven via pressure roller rotation.

The tape player has a base portion and a cartridge receiving cavity. A cylindrical capstan is located in the player base and is rotatably driven from a motor actuated flywheel. The capstan is located to drivably engage the pressure roller of a received cartridge through the cartridge front access.

The player is further provided with a substantially semicircular thrust member having a cylindrial idler wheel rotatable about its longitudinal axis at the member's first end, and anvil at the member's second end, and a means for pivotally mounting the member at its central portion to a predeterminedly located pivot in the player base. An actuating means is operable in a first mode to position the idler out of capstan engagement, and is operable in a second mode to force the idler into the capstan-second cylinder interface. With the mechanism in the second mode, the capstan disconnects from the pressure roller, and rotational drive from the capstan is coupled through the idler to the pressure roller whereby reverse drive is effected.

DETAILED DESCRIPTION OF A PREFERRED EMBODIMENT OF THE INVENTION

Figure 1:
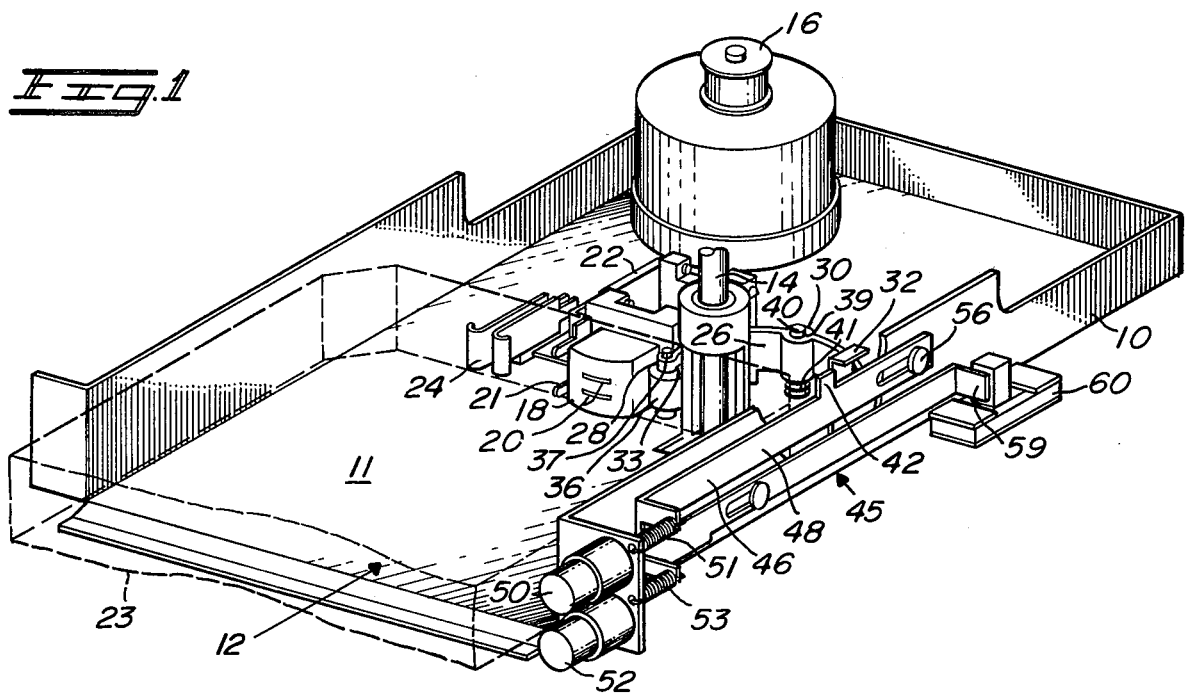
FIG. 1 is a perspective of a tape player according to the invention.

FIG. 1 illustrates a tape player according to the instant invention. The player has a housing 10 which forms a cartridge receiving cavity 12. A cylindrical capstan 14 is rotatably mounted in the housing at the recessed portion of the cavity. The capstan is rotatably driven by a flywheel (not shown) which is actuated by a motor 16. The capstan is positioned to rotatably drive the pressure roller of a received tape cartridge through the cartridge's front access cavity. A tape head 18 having a pair of pickups 20, and a tape guide 21 are supported by a head indexing means 22 which is mounted to the base 11 of the housing 10. The tape of a received tape cartridge 23 is driven past the pickups 20 by the action of the capstan 14 rotational drive. The indexing means 22 acts to align the pickups 20 with selected tracks on the tape. In line with the tape head, and mounted on the player base 11, is an end of tape sensor 24. When conductive material on the tape bridges the sensor gap, the sensor produces a signal which activates the indexing means 22.

A semicircular thrust member 26 has a first end 28, a central portion 30, and a second end 32. The first end 28 is provided with a cavity 33 for receiving a cylindrical idler wheel 36. A pin 37 extends from the upper surface of the first end cavity down through the longitudinal axis of the idler wheel 36 and finally through a hole provided in the lower surface of the cavity 33, thereby allowing the idler wheel to rotate about its longitudinal axis in the cavity 33.

The thrust member central portion 30 is provided with a hole 39 which is adapted to locate over a spindle 40 extending vertically from a predetermined position on the base 11 of the housing 10. A spring 41, which is better shown in FIG. 3, is located between the player base 11 and the thrust member central portion 30 which acts to bias, or actuate, the thrust member first end 28, and thus idler wheel 36, out of capstan 14 engagement.

The thrust member second end 32 is provided with an anvil 42. The anvil 42 is engaged by the first of two levers 46, 48 respectively, which are slidably mounted to the player housing 10, and which comprise the actuating means 45. The first lever 46 has a first end 50 projecting through an opening in the housing 10 which is manually operable externally to the tape player. A spring 51 connects between the first level 46 and the front of the housing 10 to normally bias the first lever towards the front of the housing. Similarly the second lever 48 has a first end 52 which extends through and is manually operable from the front of the housing 10. The second lever is similarly biased to the front of the housing 10 by a spring 53 connecting the housing 10 and the lever 48. The first lever 50 has a second end 56 which is aligned to engage the anvil 42. The second lever 48 is provided with a shoe 59 which is positioned to engage a mechanically operable switch 60 which is affixed to the side of the housing 10. When actuated, the switch 60 increases current through the motor 16, thereby increasing the rate of rotation of the motor 16, flywheel (not shown), and capstan 14.

PLAYER OPERATION

When a cartridge 23 is received in the player, the capstan 14 engages the cartridge pressure roller. In its first, or normal, mode the player, via the motor actuated flywheel, drives the capstan which thereby rotatably drives the pressure roller and tape. In this mode, the spring 41 biases the thrust member 26 out of engagement with the capstan 14. If the player operator manually depresses the first lever's first end 50, the player is activated to a second, or reverse mode. In this mode the first lever second end 56 engages the anvil 42 which in turn causes the thrust member 26 to rotate about the spindle 40. This rotation drives the idler wheel 36 into the pressure roller-capstan interface, whereby the capstan and pressure roller disconnect. Now rotational drive from the capstan is coupled through the idler wheel to the pressure roller. The idler wheel reverses the direction of drive of the capstan whereby the pressure roller, and tape are driven in the reverse direction. Once the first lever first end 50 is released, lever spring 51 returns the lever second end 56 to its rest position, and the thrust member spring 41 rotates the idler wheel 36 out of capstan engagement.

The operator may, in the alternative, select a fast forward mode of operation. Depression of the second lever first end 52 increases the rate of rotation of the capstan 14 via the mechanically operated switch 60. As increased capstan RPM effects increased tape drive, a fast forward mode is effected. When the first end of the second lever 52 is released, the lever returns to its rest position, via spring 53.

The rate at which the tape is driven in the forward or reverse direction is discussed at length with reference to FIG. 3.

Figure 2A:
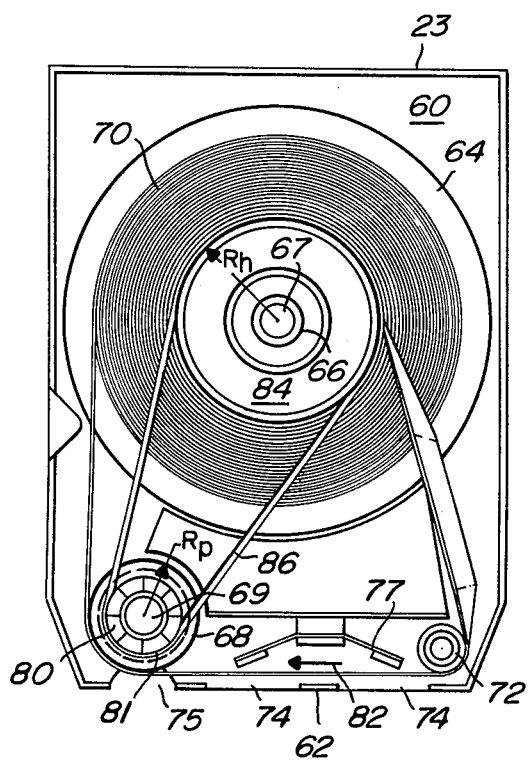
FIGS. 2A and 2B are views of a reversible stereo cartridge having the provided cutout for the drive mechanism according to the invention.

FIG. 2 illustrates a continuous loop tape cartridge which may be driven in the reverse direction via drive through the front access to the pressure roller. While a more complete explanation may be found in my aforementioned copending U.S. application Ser. No. 563,947, cartridge operation may be understood as follows. Referring to Fig. 2A, the cartridge 23 has a base portion 60 and a front wall portion 62. A platen 64 and hub 66 are rotatably located on a spindle 67 which is vertically mounted in the central portion of the base 60. A pressure roller 68 is rotatably located on a second spindle 69 which is vertically mounted near the front wall 62 of the cartridge. A continuous tape loop 70 is wound about the hub 66 and rides on the platen 64. The tape inner convolution is routed around a front guide 72, past a pair of front access openings 74, past a pressure roller front access opening 75 and around the pressure roller 68 back to an outer convolution around the hub. Affixed to the base and located behind the front access 74 are a pair of pressure pads 77.

A first pulley 80 is coupled through a sprag clutch 81 to the pressure roller 68. When the clutch is driven in a forward direction, indicated by the arrow 82, the clutch acts to decouple rotational movement of the pressure roller from the first pulley. However, when driven in a direction opposite arrow 82, i.e. the reverse direction, the clutch couples the first pulley 88 to rotate with the pressure roller 68. The first pulley 80 has a radius $R_p$.

A second pulley 84, having a predetemined radius $R_h$ is permanently affixed to the hub 66, for rotation therewith. An O-ring 86 couples rotational movement of the first pulley to the second pulley.

When a cartridge is inserted into a player, the player's capstan rotatably engages the pressure roller 68 pinching the tape 70 therebetween. This pinching frictionally drives the tape. When the player is in its first or normal mode the capstan drives the pressure roller (and tape) in a forward direction as indicated by arrow 82. This pulls the tape out from its inner convolution, around guidepost 72, past front accesses 74, past the pressure roller 68 and back to an outer convolution. The tape player's head and end of tape sensor are aligned to contact the tape through the front accesses 74. The pressure pads 77 help to keep the tape 70 against the head and sensor. In this forward mode the sprag clutch 81 decouples rotational movement of the pressure roller from the first pulley, and thus from the second pulley 84 and hub 66.

When the player is operating in the second or reverse mode, the pressure roller and tape are driven in a direction opposite arrow 82. Now the clutch 81 couples rotational movement of the pressure roller 68 to the first pulley, whereby rotational drive is coupled via O-ring 86 to the second pulley 66. The ratio of the diameter of the second pulley 84 to the first pulley 80, i.e. $R_h:R_p$ is between 1.5–2.0 to 1, thus the hub is driven at a higher rate than the pressure roller providing the necessary drive for reverse mode operation. In this reverse mode the tape is removed from an outer convolution about the hub and is routed back around the pressure roller 68, front accesses 74, and guide post 72 to an inner convolution.

Figure 2B:
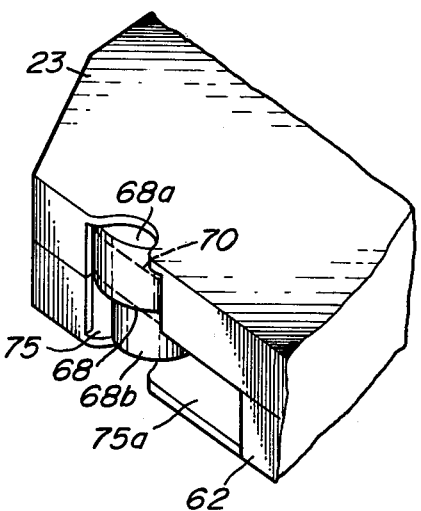

FIG. 2B illustrates the front detail of the cartridge. Shown is a cartridge housing 23 having a front wall 62. The front wall is provided with an access cavity 75 which exposes the pressure roller 68. The pressure roller 68 is comprised of a first cylinder 68a having a predetermined radius, and a second cylinder 68b having a lesser radius. The cylinders 68a, b have their longitudinal axes aligned in position to rotate about a common pivot, namely the spindle 69 (not shown). Further the cylinders are affixed one to the other to rotate in unison. The dotted lines 70 indicate the routing of the magnetic tape around the pressure roller. It is seen that the tape is aligned to rotate about the upper cylinder 68a. As is better seen in FIG. 3, the lower cylinder 68b is engageable by the idler wheel. To allow the idler access to the lower cylinder 68b, a further cutout 75a is provided in the front wall.

Operation of the drive mechanism is better understood with reference to FIG. 3. FIG. 3A illustrates a cross-sectional view of a cartridge 23 located within the cartridge receiving cavity 12 of a tape player. A cylindrical capstan 14 is located in the player base 11 and is rotatably driven from a motor actuated flywheel (not shown). The capstan 14 is located to drivably engage the pressure roller 68 of a received cartridge 23. Cartridge 23 is shown having a base portion 60. The pressure roller 68 is rotatably mounted to the base 60 via a spindle 69 extending vertically from the base. The pressure roller 68 is comprised of a first cylinder 68a having a first predetermined radius R, and a second cylinder 68b having second radius r, which second radius is smaller than the first radius. The longitudinal axes of the cylinders 68a, b are aligned in position on spindle 69, and the cylinders affixed one to the other to rotate in unison. A sprag clutch 81 couples the first cylinder 68a to a pulley 80 when the cylinder is driven in the reverse direction, the clutch otherwise decoupling rotational motion from the cylinder to the pulley. An O-ring 86 is located about the pulley 80 and extends to a second pulley located on the hub (not shown). Dashed lines 70 indicate the routing of the magnetic tape. The tape is routed over the surface of the first cylinder 68a, and is driven via the frictional interface of the pressure roller 68a with the capstan 14.

A semicircular thrust member 26 has a first end 28, a central portion 30, and a second end 32. The first end is provided with a cavity 33 suitable for housing a cylindrical idler wheel 36. The wheel is rotatably mounted in the cavity via a pin 37 extending from the upper to lower suface of the cavity 33 and extending through the longitudinal axis of the idler 36 which is positioned therebetween. The idler is of a vertical dimension to be rotatably located within the cavity 33, and of a predetermined radius R' which allows a desired fast reverse rate of operation.

Thrust member 26 is provided at central portion 30 with a pivot hole 39. The hole 39 is adapted to mount over a spindle 40 provided in a predetermined location on the base 11 of the player. Spindle 40 and pivot hole 39 provide a pivotal axis for the thrust member 26 to rotate about.

A spring 41 whose turns are located about spindle 40 has a first end 70 inserted in a thrust member slot 72, and a second end 73 inserted in a hole 74 provided in the player base 11. The spring acts as a source of actuation to normally bias the thrust member 26 in a rest position which is out of engagement with the capstan 14.

The capstan 14 is shown in its normal or forward mode rotating in a direction indicated by arrow 80. The tape 70 is frictionally driven between capstan 14 and pressure roller 68, and thus the tape is driven in a direction indicated by arrow 83.

Figure 3C:
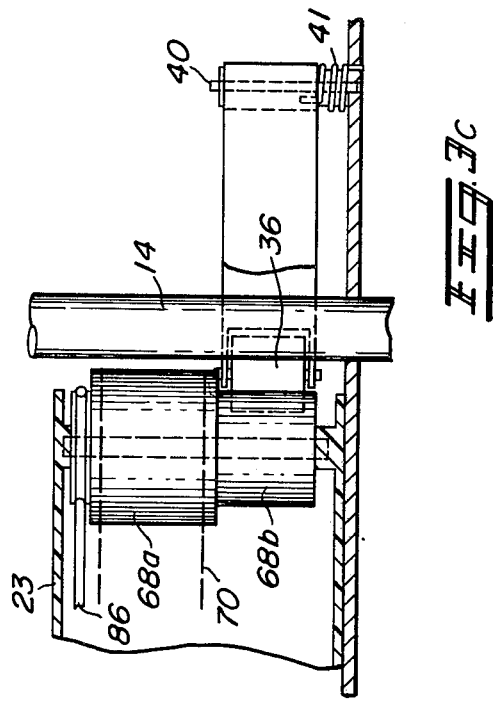
FIGS. 3A, 3B, 3C and 3D illustrate the operation of a mechanism according to the instant invention.
Figure 3D:
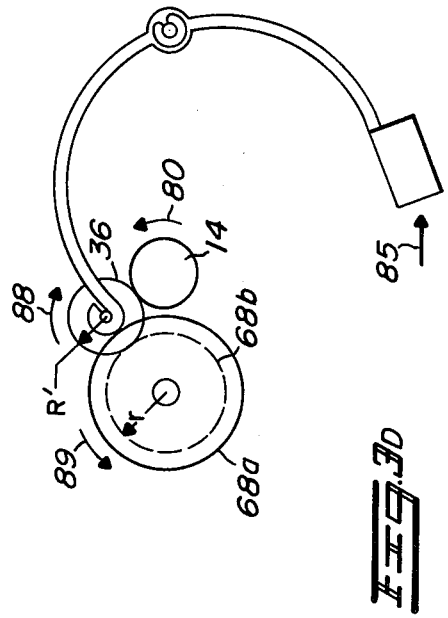
Figure 3A:
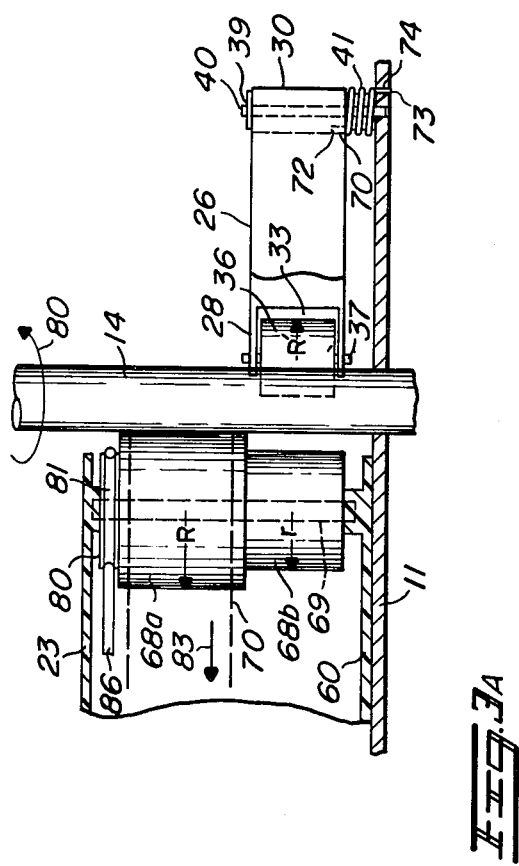
Figure 3B:
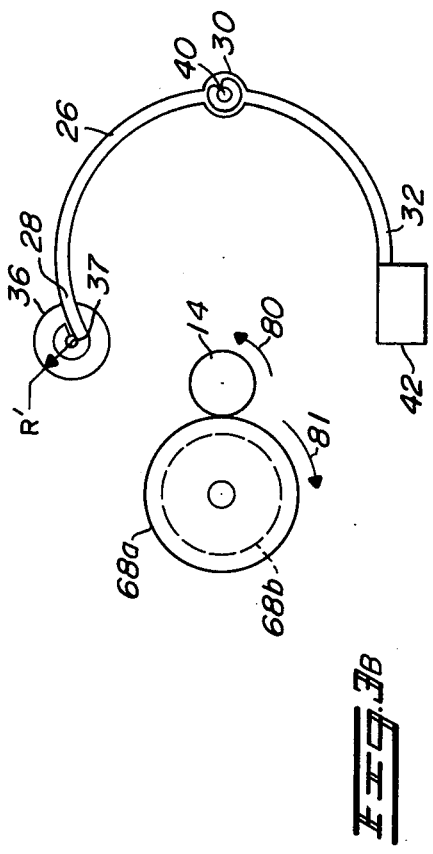

FIG. 3B illustrates a view of the mechanism as shown in FIG. 3A from a point above the capstan looking down on the mechanism. Also shown in FIG. 3B is the thrust member second end 32. As discussed with reference to FIG. 1, the second end 32 is provided with an anvil 42 which is engageable by the actuating means. As seen in FIG. 3B the capstan 14 is rotating in direction 80, resulting in a rotational drive of the pressure roller 68 in a direction 81. The spring 41 locates the thrust member 26 out of engagement with the pressure roller and capstan.

FIG. 3C illustrates operation of the tape player into the second or fast reverse mode of operation. In this mode the actuating lever engages the anvil of the thrust member (as shown in FIG. 3D) to rotate thrust member 26 about its pivotal axis, forcing the idler wheel 36 into the capstan 14 and second cylinder 68b interface. Two benefits result from the idlers intervention. First, the pressure roller and cartridge are displaced in a direction, indicated by arrow 90 in FIG. 3C, a slight distance in a direction out of the cartridge receiving cavity. This dislocates the tape 70 from the player's internal working parts, e.g. the tape head and end of tape sensor. Without this dislocation deleterious wear would result to both the tape and player components. Further, the idler acts to reverse the direction of drive to the pressure roller. As seen in FIG. 3D the capstan 14 is rotating in a direction indicated by arrow 80. This rotation causes the idler 68 to rotate in a direction indicated by arrow 88. The idler in turn forces the pressure roller 68 to rotate in a direction 89, which is seen to be opposite the direction indicated by arrow 81 in FIG. 3B. In this manner a reverse drive through the front access to the pressure roller of the reversible cartridge is effected.

The rate of reverse drive is seen to be a function of the rate of rotation of the capstan 14, the radius of the capstan 14, the idler wheel radius R', and the radius of the second cylinder r. By increasing the idler wheel radius R', and decreasing the second cylinder radius r an increased rate of reverse drive is effected.

Once the actuating lever is released, the spring 41 returns the thrust member 26 to a rest position out of engagement with the capstan 14, the system returns to the first mode as shown in FIGS. 3A, B, forward movement of the cartridge being provided by means engaging the notch (See FIG. 2) in the side wall of the cartridge as known in the art.

Upon depression of the second actuating means, i.e. the second lever 48 as shown in FIG. 1, the rate of capstan rotation is increased. Thus, referring to FIG. 3B, the capstan is caused to rotate at this increased rate in a direction shown by arrow 80, which in turn causes increased pressure roller drive in a direction shown by arrow 81, thereby increasing the rate of tape drive. In this manner a fast forward mode of operation is effected.

Thus a means has been described for driving a reversible cartridge through a cartridge front access to the pressure roller in a fast forward or a fast reverse mode.

While preferred embodiments of the invention have been disclosed, many variations or modifications thereto are all possible, all falling within the true spirit and scope of the invention.

I claim

1. A drive mechanism in a tape cartridge and tape player combination including
the cartridge having a base portion and front wall, a pressure roller rotatably mounted to the base and accessible through an access in the front wall, tape in the cartridge driven via pressure roller rotation,
the tape player having a base portion and cartridge receiving cavity, a cylindrical capstan located in the player base and rotatably driven from a motor actuated flywheel, the capstan located to drivably engage the pressure roller of a received cartridge through the cartridge front access,
wherein the improvement comprises
a thrust member having a rotatably mounted idler wheel at one end, and
actuating means operable in a first mode to position the idler out of capstan engagement, and operable in a second mode to force the idler into the capstan-pressure roller interface, the actuating means comprising a spring member coupling between the player base and thrust member, the spring tending to bias the thrust member out of capstan engagement,
whereby in the second mode capstan rotational drive couples through the idler to the roller.

2. The mechanism of claim 1 wherein the idler is substantially cylindrical in shape having a predetermined radius and a predetermined vertical dimension.

3. The mechanism of claim 2 further comprising the thrust member substantially semicircular in shape, having the idler at its first end, an anvil at its second end, and means for pivotally mounting the member at its central portion.

4. The mechanism of claim 3 wherein the thrust member further comprises the first end provided with a cavity for receiving the idler vertical dimension, the cavity having an upper and lower surface, and further comprising the idler rotatably mounted in the member cavity via a pin extending from upper to lower surface through the longitudinal axis of the idler which is positioned therebetween.

5. The mechanism of claim 3 wherein the thrust member pivot is a hole adapted to locate over a spindle which extends from the base of the player at a predetermined location.

6. The mechanism of claim 3 wherein the actuating means further comprises a first lever, slidably mounted to the player, having first and second ends, the first end manually operable externally to the player, the second end aligned to forcibly engage the anvil, a lever spring biasing the second end out of engagement with the anvil, whereby manual operation of the first end forces the second end to engage the anvil thereby rotating the thrust member about its pivot and forcing the idler into the capstan-roller interface.

7. The mechanism of claim 6 wherein the actuating means further comprises a second lever, slidably mounted to the player, having first and second ends, the first end manually operable externally to the player,
a mechanically operable switch mounted to the player, the switch operable in an actuated mode to increase the rate of rotation of the capstan,
the second lever provided with a means for actuating the switch when the second lever first end is manually operated, and
a second lever spring biasing the second end out of switch actuation,
whereby manual operation of the second lever first end causes an increase in the rate of capstan rotation.

8. The mechanism of claim 1 wherein the pressure roller is comprised of a first cylinder having a predetermined radius, a second cylinder having a lesser radius, the cylinders having their longitudinal axes aligned and positioned to rotate about a common pivot, and the cylinders affixed one to the other to rotate in unison.

9. The mechanism of claim 8 wherein the thrust member is constrained to force the idler to engage the capstan and second cylinder through a provided cartridge front access when actuated to the second mode.

10. A drive mechanism in a cartridge and tape player combination including
the cartridge having a base portion and front wall, a pressure roller rotatably mounted to the base and accessible through an access in the front wall,
the tape player having a base portion and cartridge receiving cavity, a cylindrical capstan located in the player base and rotatably driven from a motor actuated flywheel, the capstan located to drivably engage the pressure roller of a received cartridge through the cartridge front access,
wherein the improvement comprises the pressure roller comprised of a first cylinder having a predetermined radius, a second cylinder having a lesser radius, the cylinders having their longitudinal axes aligned and positioned to rotate about a common pivot, and the cylinders affixed one to the other to rotate in unison, tape in the cartridge driven via pressure roller rotation,
a substantially semicircular thrust member having a cylindrical idler rotatable about its longitudinal axis at its first end, an anvil at its second end, and means for pivotally mounting the member at its central portion to a predeterminedly located pivot in the player base, and
actuating means operable in a first mode to position the idler out of capstan engagement, and operable in a second mode to force the idler into the capstan-second cylinder interface, said actuating means comprising a bias means adapted to bias the thrust member out of engagement with the capstan,
whereby in the second mode capstan rotational drive couples through the idler to the roller.

11. The mechanism of claim 10 wherein the bias means comprises a spring member located between the player base and thrust member, the spring predeterminedly positioned to locate the thrust member out of capstan engagement.

12. The mechanism of claim 11 wherein the actuating means further comprises a first lever, slidably mounted to the player, having first and second ends, the first end manually operable externally to the player, the second end aligned to forcibly engage the anvil, a lever spring biasing the second end out of engagement with the anvil,
whereby manual operation of the first end forces the second end to engage the anvil thereby rotating the thrust member about its pivot and forcing the idler into the capstan-roller interface.

13. The mechanism of claim 12 wherein the actuating means further comprises a second lever, slidably mounted to the player, having first and second ends, the first end manually operable externally to the player, a second lever spring biasing the second end out of engagement with the anvil,
a mechanically operable switch mounted to the player, the switch operable in an actuated mode to increase the rate of rotation of the capstan, and
the second lever provided with a means for actuating the switch when the second lever first end is manually operated
whereby manual operation of the second lever first end causes an increase in the rate of capstan rotation.

14. A tape cartridge having a continuous loop tape drivable in a forward or reverse direction via rotational drive applied to the cartridge pressure roller
wherein the improvement comprises
the pressure roller comprised of a first cylinder having a predetermined radius, a second cylinder having a lesser radius, the cylinders having their longitudinal axes aligned and positioned to rotate about a common pivot, and the cylinders affixed one to the other to rotate in unison,
means for guiding the tape past the first cylinder, and
means for forcibly engaging the second cylinder for driving the tape at increased speed in the reverse or forward directions.

15. A reversible continuous loop tape cartridge comprising a housing having a base portion and a front wall portion, the front wall portion provided with a front access cavity, a hub means rotatably located on the base, a pressure roller rotatably located on the base and engagably accessible through the front access to be rotatably driven in a forward or reverse direction, a continuous tape loop wound on the hub, routed around the pressure roller to be driven therewith, the tape being driven in the forward direction by being removed from the hub means at the inner convolution and returned to the hub means at the outer convolution, means coupling the rotational movement of the pressure roller to the hub when the pressure roller is driven in the reverse direction and decoupling the rotational movement of the pressure roller from the hub when the pressure roller is driven in the reverse direction, wherein the improvement comprises the pressure roller comprised of a first cylinder having a predetermined radius, a second cylinder having a lesser radius, the cylinders having their longitudinal axes aligned and positioned to rotate about a common pivot, and the cylinders affixed one to the other to rotate in unison, means for guiding the tape past the first cylinder, and the front wall further provided with an access cavity allowing entrance of an external drive means to the second cylinder.

* * * * *